(12) United States Patent
Sorg (10) Patent No.: US 12,434,261 B2
(45) Date of Patent: Oct. 7, 2025

(54) NEGATIVE PRESSURE FLUID RESERVOIR SYSTEM

(71) Applicant: Appalachia Design, Cardington, OH (US)

(72) Inventor: Daniel Sorg, Elizabethton, TN (US)

(73) Assignee: Appalachia Design, Cardington, OH (US)

( * ) Notice: Subject to any disclaimer, the term of this patent is extended or adjusted under 35 U.S.C. 154(b) by 316 days.

(21) Appl. No.: 18/155,236

(22) Filed: Jan. 17, 2023

(65) Prior Publication Data

US 2024/0238836 A1  Jul. 18, 2024

(51) Int. Cl.
    B05C 17/005 (2006.01)
    B05C 17/01 (2006.01)

(52) U.S. Cl.
    CPC ........ B05C 17/00573 (2013.01); B05C 17/01 (2013.01)

(58) Field of Classification Search
    CPC ......................... B05C 17/01; B05C 17/00573
    See application file for complete search history.

(56) References Cited

U.S. PATENT DOCUMENTS

| | | | | |
|---|---|---|---|---|
| 1,639,409 A * | 8/1927 | Johnson | ..................... | F16N 3/12 222/324 |
| 2,205,667 A * | 6/1940 | Plummer | ................... | F16N 5/02 222/324 |
| 2,833,449 A * | 5/1958 | Morton | ................... | F16N 13/08 222/256 |
| 4,601,412 A * | 7/1986 | Martin | ...................... | F16N 3/12 222/386 |
| 4,664,298 A * | 5/1987 | Shew | ........................ | F16N 3/12 222/409 |
| 4,718,577 A * | 1/1988 | Morris | .................... | B65D 25/22 222/105 |
| 5,277,339 A * | 1/1994 | Shew | ........................ | F16N 3/12 222/256 |

(Continued)

FOREIGN PATENT DOCUMENTS

CN           215304733 U     12/2021
JP           2000279302 A    10/2000
                (Continued)

OTHER PUBLICATIONS

SiLER, "Portable Induction Cooktop", https://www.amazon.com/Portable-Induction-Countertop-Temperature-Stainless/dp/B07FDXPTNP, Retrieved on Dec. 8, 2022, pp. 9.

*Primary Examiner* — Frederick C Nicolas
(74) *Attorney, Agent, or Firm* — Jeremy Briggs (57) ABSTRACT

A fluid reservoir configured to attach to a pump head is disclosed. The fluid reservoir may include an attachment configured to engage with a pump head socket. The attachment may include threads at an attachment outer surface portion. The fluid reservoir may further include a fluid reservoir main body having a proximal portion and a distal portion. The proximal portion may be connected to the attachment and the distal portion may include a first sealed seam. The fluid reservoir main body may be flexible and configured to dispense fluid from the fluid reservoir when a negative pressure is applied to a fluid reservoir interior side. An attachment diameter may be equal or equivalent to a proximal portion diameter.

20 Claims, 6 Drawing Sheets

(56) References Cited

U.S. PATENT DOCUMENTS

| | | | | |
|---|---|---|---|---|
| 6,834,781 B1* | 12/2004 | Mueller | ............... | F16N 5/02 |
| | | | | 222/262 |
| 7,337,927 B2* | 3/2008 | Linkletter | ............ | F16N 3/12 |
| | | | | 222/378 |
| 7,377,406 B2* | 5/2008 | Linkletter | ........ | G01F 11/026 |
| | | | | 222/378 |
| 7,527,176 B2* | 5/2009 | Weems | ............ | F16N 3/12 |
| | | | | 222/327 |
| 8,297,476 B2* | 10/2012 | Weems | ............ | F16N 3/12 |
| | | | | 222/1 |
| 9,062,825 B2* | 6/2015 | Ryan | ............ | F16N 5/02 |
| 9,297,498 B1* | 3/2016 | Kuntzelman | ........ | F16N 3/12 |
| 9,486,109 B2 | 11/2016 | Clothier | | |
| 10,221,995 B1* | 3/2019 | Kuo | ............ | F16N 3/12 |
| 10,711,944 B2* | 7/2020 | Sorg | ............ | F16N 3/12 |
| 10,808,885 B2* | 10/2020 | Schlenker | ........ | F16N 13/08 |
| 11,219,909 B2* | 1/2022 | Sun | ............ | B05B 11/0038 |
| 2005/0230429 A1* | 10/2005 | Weems | ............ | F16N 3/12 |
| | | | | 222/383.1 |
| 2007/0248292 A1* | 10/2007 | Wolf | ............ | B65D 33/007 |
| | | | | 383/33 |
| 2010/0000980 A1 | 1/2010 | Popescu | | |
| 2010/0116850 A1* | 5/2010 | Weems | ............ | F16N 3/12 |
| | | | | 222/326 |
| 2013/0087584 A1* | 4/2013 | Guo | ............ | F16N 3/12 |
| | | | | 222/323 |
| 2017/0042370 A1 | 2/2017 | Liao | | |

FOREIGN PATENT DOCUMENTS

| | | |
|---|---|---|
| JP | 2016137067 A | 8/2016 |
| WO | 2016121624 A1 | 8/2016 |

\* cited by examiner

NEGATIVE PRESSURE FLUID RESERVOIR SYSTEM

TECHNICAL FIELD

The present disclosure relates to a fluid reservoir, and more specifically to a flexible grease reservoir that may be configured to attach to a grease gun and dispense grease when the grease gun pump generates a negative pressure inside the fluid reservoir inverse to the constant positive atmospheric pressure being applied to the entire flexible exterior surface of the fluid reservoir.

BACKGROUND

Machine operators use grease guns to apply grease to machine components, such as bearings, joints, shafts, other moving parts, and/or the like. A conventional grease gun includes two basic components. The first component being a grease gun head typically incorporating a pumping mechanism actuated by pneumatic, electrical, or manual mechanical means. The second basic component being a grease container/housing typically containing grease or a grease filled cartridge. An operator may load grease directly from a bulk source, or load a pre-filled grease cartridge into the grease container/housing. A pull rod mechanism containing a compression spring and piston plunger or other similar mechanisms in communication with the grease container/housing, must be used by the operator to encourage grease from the grease container to the grease gun head which in turn pumps grease to the machine components.

Grease guns are usually configured to operate with disposable pre-filled grease cartridges being placed inside the grease container/housing. The operator may replace an empty grease cartridge with a new pre-filled full grease cartridge when the cartridge runs out of grease. Loading/unloading a conventional grease cartridge to/from a grease gun may cause inconvenience to the operator. For example, the operator may have to pull the plunger completely from the grease gun, unscrew the grease gun container/housing from the grease gun head, take out the empty grease cartridge from the container/housing, insert the pre-filled full grease cartridge into the grease container/housing, and again screw the container to the grease gun head. Further, the process of loading or unloading the conventional grease container/housing may result in spillage of grease.

Thus, there is a need for a stand-alone, pre-filled fluid reservoir that may be easy to replace, and particularly a grease reservoir eliminating the need for a grease container/housing, the pull rod mechanism with the compression spring and piston, which is necessary in conventional grease guns to encourage grease from the grease container/housing to the inlet of the pump in communication with the grease gun head.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a fluid reservoir that may attach to a pump head, for example, a grease gun. The fluid reservoir may include a flexible main body that may be configured to store fluid, such as grease or other semi-solid lubricants. A user may use the grease gun pump to generate a negative pressure inside the flexible main body of the fluid reservoir, which causes constant positive atmospheric pressure outside of same flexible main body to encourage grease into the pump inlet. The fluid reservoir may further include a rigid attachment that may be connected with a flexible main body proximal portion. The attachment may enable the user to attach the fluid reservoir to the grease gun. Specifically, an attachment outer surface may include a threaded portion that may engage with a threaded portion of a grease gun socket, thus enabling the fluid reservoir to attach to the grease gun. The user may engage or disengage the fluid reservoir to/from the grease gun by using the threaded portions.

In some aspects, a flexible main body distal portion may include one or more sealed seams. For example, the flexible main body distal portion may include a single seam that may form a fluid reservoir crimped end. In another example, the flexible main body distal portion may include two sealed seams that may be disposed at an angle of 90 degrees from each other. A fluid reservoir with two sealed seams may allow the user to stably place the fluid reservoir vertically on a planar/flat surface.

The present disclosure discloses a fluid reservoir that may be easy to replace from a grease gun. For example, the user may engage or disengage the fluid reservoir from the grease gun by using the threaded portions. Further, the fluid reservoir does not require any additional hardware, for example, a pull rod mechanism, or plunger with compression spring and piston to dispense grease. The user may dispense the grease from the fluid reservoir by generating a negative pressure inside the flexible main body simply by operating the grease gun pump. Furthermore, the user may easily place the fluid reservoir with two sealed seams on a flat surface or a packaging container, without using any external support. The two-seam arrangement provides a stable base to the fluid reservoir and prevents the fluid reservoir from falling from the flat surface.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
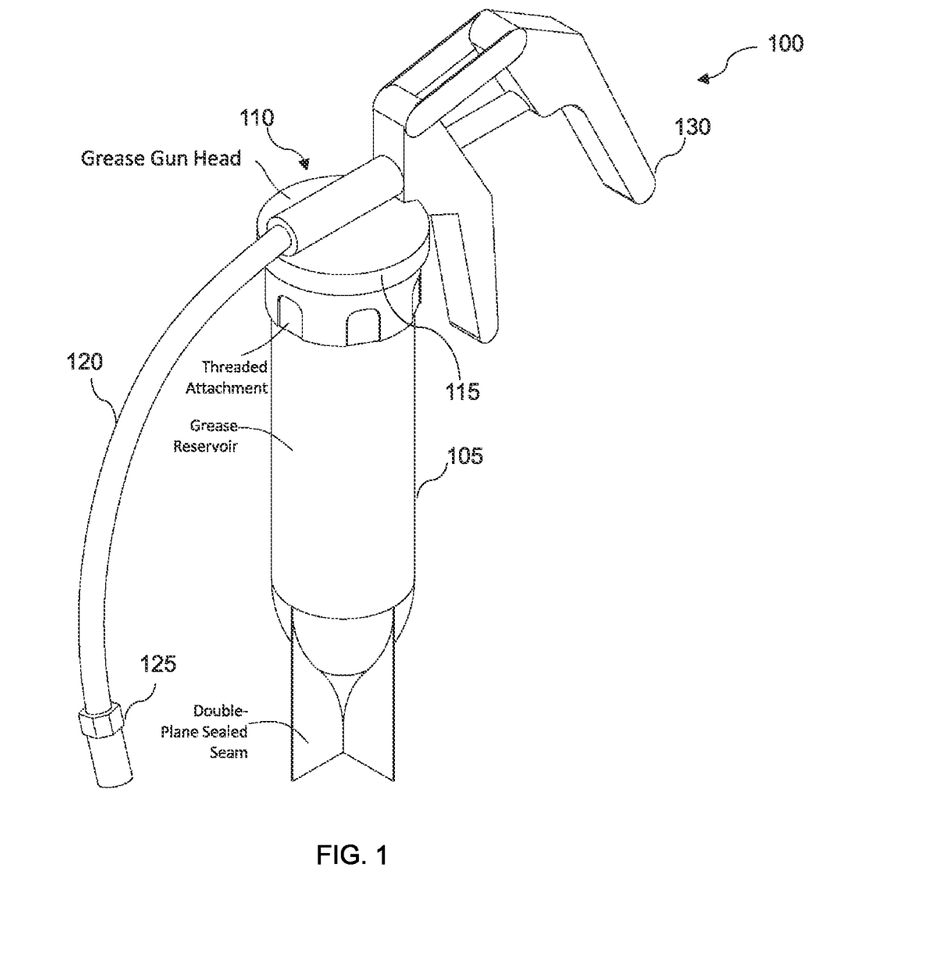
FIG. 1 depicts an example grease gun in accordance with the present disclosure.

FIG. 1 depicts an example grease gun 100 in accordance with the present disclosure. The grease gun 100 may include a replaceable fluid reservoir 105 at a grease gun distal end. The fluid reservoir 105 may store fluid such as grease or other solid/semi-solid lubricants or fluids. The grease may be a multipurpose grease, an automotive grease, an industrial grease, a marine grease and the like.

The fluid reservoir 105 may include threads (not shown) at a fluid reservoir proximal end. Specifically, an outer surface of the fluid reservoir proximal end may include threads, which may engage with a grease gun head 110. The grease gun head 110 may include a grease gun socket 115. The grease gun socket 115 may have threads at a socket inner surface. Fluid reservoir proximal end threads may engage with grease gun socket threads to securely attach the fluid reservoir 105 to the grease gun head 110.

The grease gun head 110 may further include grease pathways (not shown) that may enable grease to move from the fluid reservoir 105 to a flexible hose 120. The hose 120 may be a tube through which the grease may move from the grease gun 100 to machine components to be lubricated. For example, a grease gun operator ("user") may position the hose 120 in proximity to the machine components and may use the grease gun 100 to dispense grease from the fluid reservoir 105. In some aspects, the user may couple an additional tube (not shown) to the hose 120 and elongate a hose 120 length, which may enable the user to conveniently apply grease to the machine components. The hose 120 may removably couple with the additional tube via a coupling member 125. The coupling member 125 may allow a secure connection of the hose 120 with the additional tube.

The grease gun 100 may further include a lever 130 that may couple with the grease gun head 110. The lever 130 may allow the user to hand-pump the grease from the fluid reservoir 105 to the hose 120. Stated another way, the lever 130 may provide negative pressure to encourage the grease to move out of the fluid reservoir 105. Specifically, when the user hand-pumps the lever 130, being in communication with the pumping mechanism within grease gun head 110, generates a negative pressure inside the fluid reservoir 105 (e.g., in a fluid reservoir interior side). Negative pressure generation encourages the grease to move out from the fluid reservoir 105 and into the pump through the pump inlet. The operation of the pump in turn forces grease towards the hose 120. The user may then apply the grease to the machine components via the hose 120 (or via the additional tube coupled with the hose 120).

In some aspects, the user may conveniently disengage the fluid reservoir 105 from the grease gun head 110 when the fluid reservoir 105 runs out of grease (e.g., when the user uses the grease stored in the fluid reservoir 105), or when it is desirable to dispense a different type of grease. The user may replace the fluid reservoir 105 with a new fluid reservoir by engaging the new fluid reservoir with the grease gun head 110. In this manner, the user may easily engage/disengage a fluid reservoir to/from the grease gun 100. Further, the user may apply the grease to the machine components by using the lever 130 and may not require any additional hardware, e.g., a plunger or a pull rod mechanism, to dispense grease. Thus, the present disclosure allows easy replacement of the fluid reservoir 105 and does not require additional hardware to dispense grease.

Figures 2A, 2B:
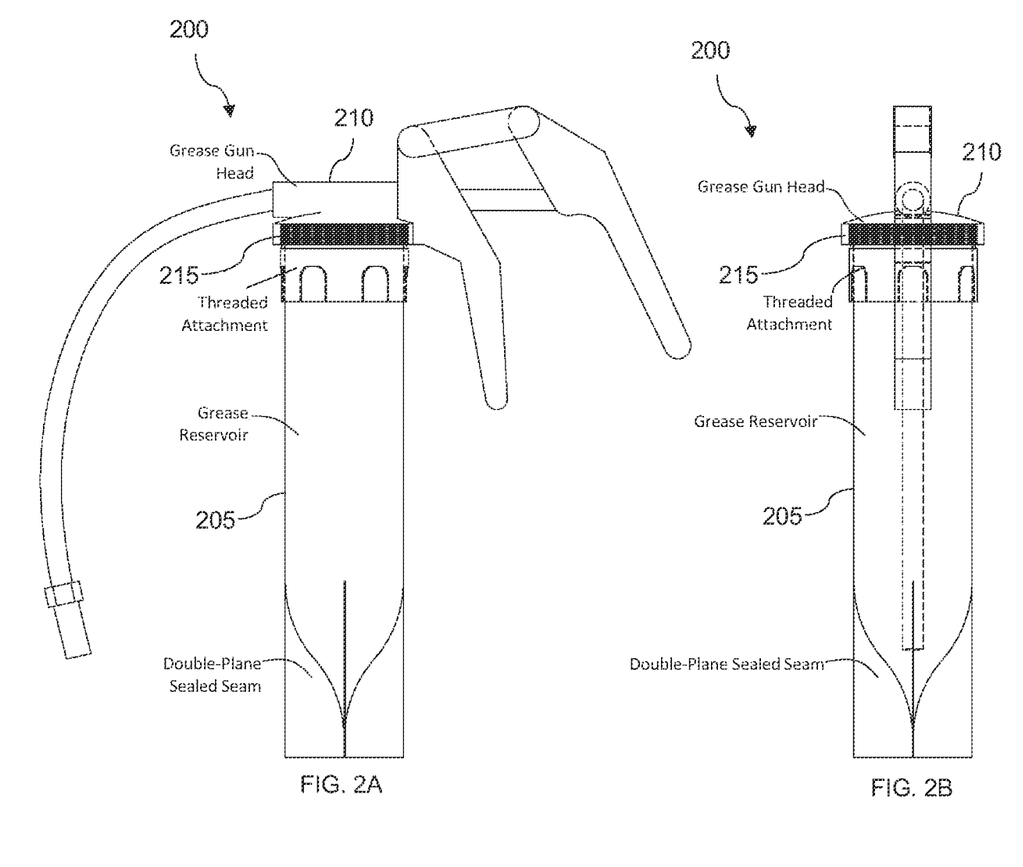
FIGS. 2A and 2B depict side and back views of a grease gun in accordance with the present disclosure.

FIGS. 2A and 2B depict side and back views of a grease gun 200 in accordance with the present disclosure. The grease gun 200 may be same as the grease gun 100. FIG. 2A depicts a side view of the grease gun 200 and FIG. 2B depicts a back view of the grease gun 200. The grease gun 200 may include a fluid reservoir 205 (same as the fluid reservoir 105) and a grease gun head 210 (same as the grease gun head 110). FIGS. 2A and 2B further depicts a threaded attachment 215 through which the fluid reservoir 205 (specifically, the fluid reservoir proximal end) and the grease gun head 210 (specifically, the grease gun socket 115) may removably engage with each other. The user may replace the fluid reservoir 205 by disengaging the fluid reservoir 205 from the threaded attachment 215 and engaging a new fluid reservoir with the threaded attachment 215.

Remaining grease gun 200 elements are same as grease gun 100 elements, and are not described again here for the sake of simplicity and conciseness.

Figure 3A:
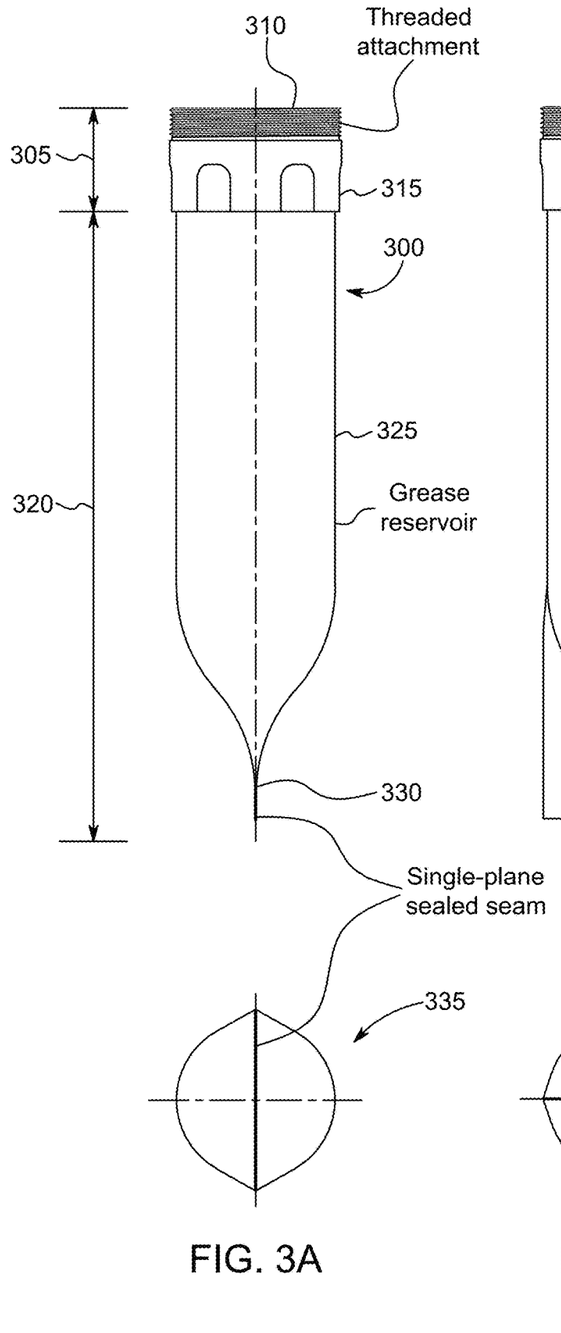
FIG. 3A depicts an example fluid reservoir in accordance with the present disclosure.

FIG. 3A depicts an example fluid reservoir 300 in accordance with the present disclosure. In particular, FIG. 3A depicts a side view of the fluid reservoir 300. The fluid reservoir 300 may be configured to store fluid such as grease or other solid or semi-solid lubricants. The grease may be a multipurpose grease, an automotive grease, an industrial grease, marine grease and the like. The fluid reservoir 300 may be of any length, thickness or diameter.

The fluid reservoir 300 may include an attachment 305 that may be disposed at a fluid reservoir proximal end. Specifically, the attachment 305 may be connected to a fluid reservoir proximal portion. The attachment 305 may engage with a grease gun socket, e.g., the grease gun socket 115. In other words, the attachment 305 may be configured to attach the fluid reservoir 300 with the grease gun 100. In some aspects, the attachment 305 may be made of plastic, metal and/or the like. Further, the attachment 305 may be annular in shape.

The attachment 305 may include a first attachment portion 310 and a second attachment portion 315. The first attachment portion 310 may be threaded. Specifically, the first attachment portion 310 may be outside-threaded, which may engage with a grease gun socket 115 internal threading. Stated another way, the first attachment portion 310 may include threads at an attachment outer surface, which may engage with threads at a grease gun socket inner surface. In some aspects, a first attachment portion 310 length may be same as a second attachment portion 315 length. In other aspects, the first attachment portion 310 length may be less than the second attachment portion 315 length, or vice versa. A person ordinarily skilled in the art may appreciate that the first attachment portion 310 length and the second attachment portion 315 length may depend on a grease gun 100 design, size and shape, and specifically based on a grease gun socket 115 design, size and shape.

The fluid reservoir 300 may further include a removable closure (not shown) on the attachment 305. The removable closure may be made of aluminum. In some aspects, the removable closure may protect the attachment 305 from ambient environment when the fluid reservoir 300 is not in use (e.g., when the fluid reservoir 300 is not connected to the grease gun 100). The user may remove the removable closure from the attachment 305 before attaching the fluid reservoir 300 with the grease gun 100 via the attachment 305.

The fluid reservoir 300 may further include a fluid reservoir main body 320 at a fluid reservoir distal portion. The fluid reservoir main body 320 may be flexible and may have a length that may be greater than an attachment length. In some aspects, the fluid reservoir main body 320 may be made of rubber or plastic (such as soft plastic). The fluid reservoir main body 320 may include a first body portion 325 and a second body portion 330. The first body portion 325 may be disposed at a fluid reservoir proximal end and the second body portion 330 may be disposed at a fluid reservoir distal end. Stated another way, the fluid reservoir main body 320 may include a proximal portion (e.g., the first body portion 325) and a distal portion (e.g., the second body portion 330). The first body portion 325 may be configured to store grease (or other lubricants), and may dispense grease when the grease gun 100 applies negative pressure inside the fluid reservoir main body 320 (as described in conjunction with FIG. 1).

The first body portion 325 may connect with the attachment 305, which in turn may connect with the grease gun socket 115. In particular, the first body portion 325 may connect with the second attachment portion 315. The second attachment portion 315 may be configured to closely fit on first body portion 325 walls.

In some aspects, the first attachment portion 310 may be a part of the first body portion 325 and may form a unitary structure, which may be formed using molding technique.

In some aspects, the first body portion 325 may be cylindrical in shape. In addition, a first body portion 325 diameter may be same as or equivalent to an attachment diameter, which in turn may be same as or equivalent to a grease gun socket 115 diameter. In other words, the fluid reservoir 300 may have a uniform diameter throughout a fluid reservoir 300 length. Further, a first body portion 325 length may be greater than a second body portion 330 length.

In other aspects, the first body portion 325 may be in a shape of a cuboid, a pentagonal prism and the like.

The second body portion 330 may include a first sealed seam. Specifically, the second body portion 330 may include a closed end that may be flattened or crimped. A bottom view of the fluid reservoir 300, having the first sealed seam, is shown as a view 335. The first sealed seam may be perpendicular to a fluid reservoir main body 320 longitudinal axis.

Figure 3B:
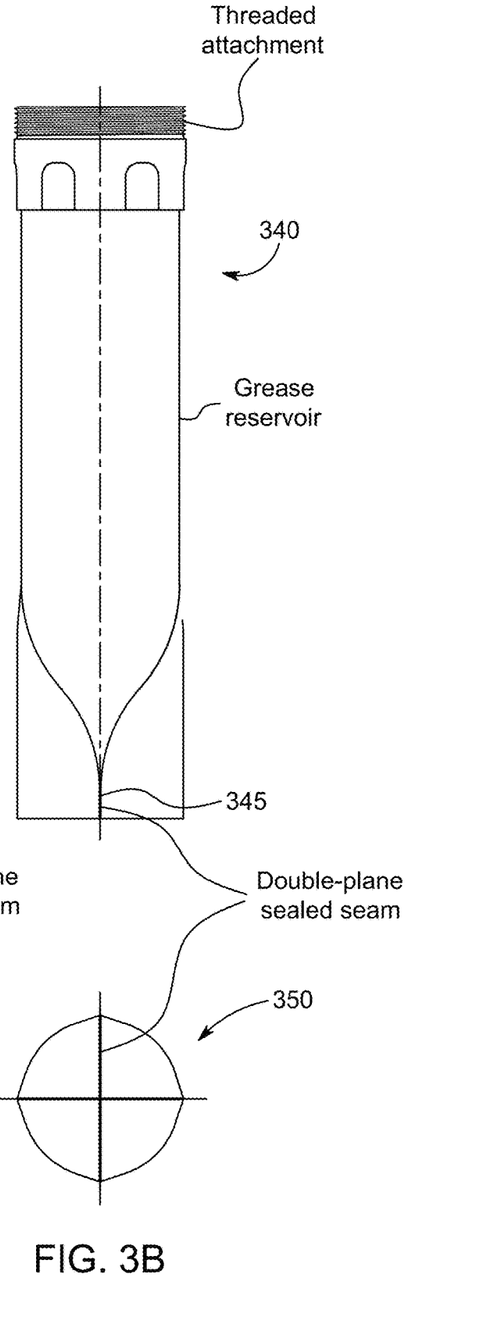
FIG. 3B depicts another example fluid reservoir in accordance with the present disclosure.

FIG. 3B depicts a fluid reservoir 340 in accordance with the present disclosure. The fluid reservoir 340 may have a double-sealed seam. Specifically, the fluid reservoir 340 may be similar to the fluid reservoir 300, however a second body portion 345 of the fluid reservoir 340 may include two seams (the first sealed seam and a second sealed seam). The first sealed seam and the second sealed seam may be perpendicular to each other, as shown in a bottom view 350 of the fluid reservoir 340.

A person ordinarily skilled in the art may appreciate that the double-sealed seam (i.e., an arrangement of perpendicular first and second sealed seams) which may allow the user to place the fluid reservoir 340 vertically on a planar surface without any external support. Thus, the double-sealed seam enhances fluid reservoir 340 usability and makes it easier for the user to place the fluid reservoir 340 vertically on a surface when the user may not use the fluid reservoir 340. The double-sealed seam may also enable the user to easily store and transport the fluid reservoir 340, as described below in conjunction with FIG. 6.

In additional aspects, the second body portion 345 may include more than two seams, for example, three, four or more seams (not shown in FIG. 3B). The seams may be aligned at a predefined angle from each other and may provide a stable base to the fluid reservoir 340.

Figure 4A:
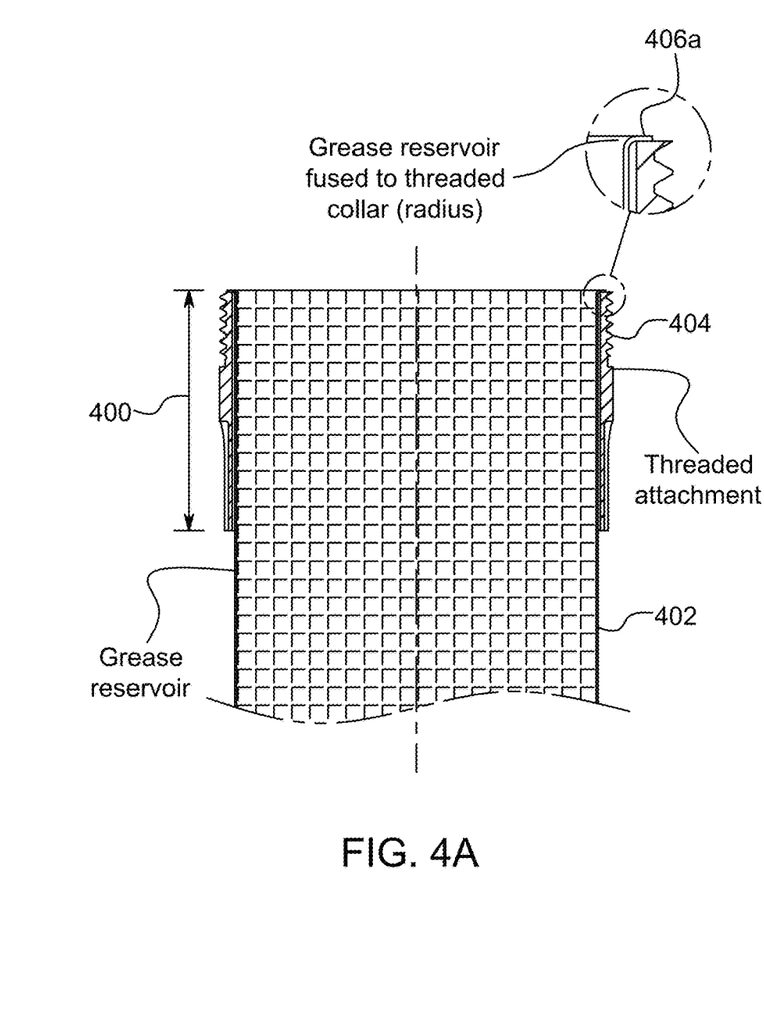
FIGS. 4A and 4B depict an example attachment of a fluid reservoir in accordance with the present disclosure.
Figure 4B:
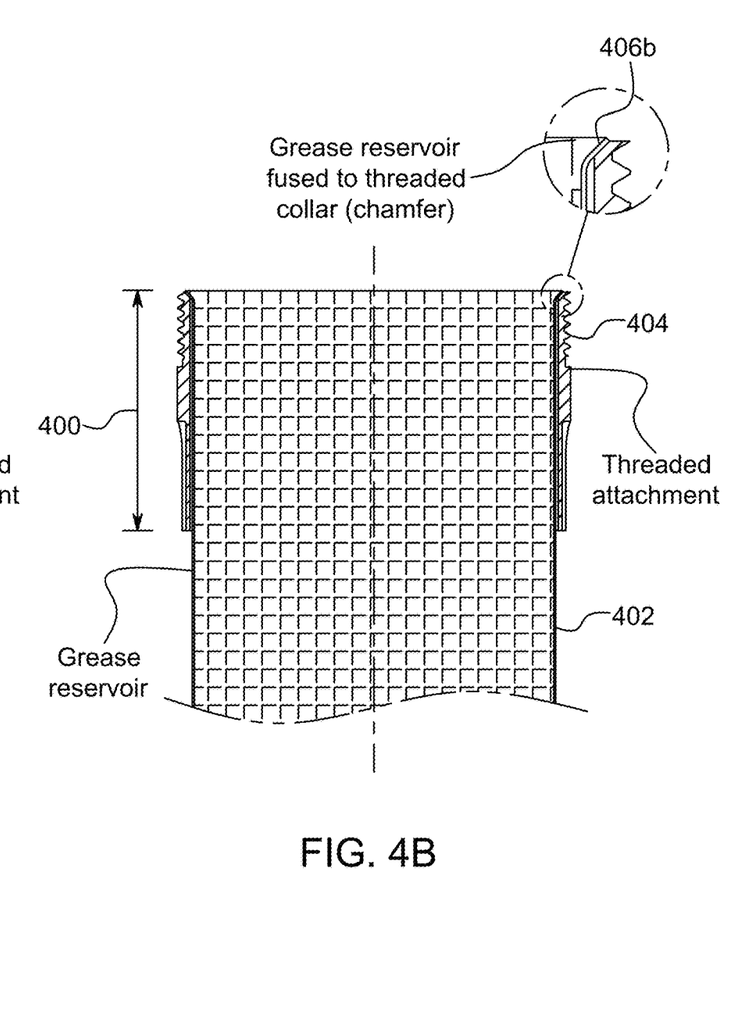

FIGS. 4A and 4B depict an example attachment 400 of a fluid reservoir (e.g., the fluid reservoir 340) in accordance with the present disclosure. The attachment 400 may be same as the attachment 305. The attachment 400 may fuse with a fluid reservoir main body 402. In some aspects, the attachment 400 and the fluid reservoir main body 402 may form a unitary structure or a single piece tube. The attachment 400 may include threads 404 that may enable the user to engage the fluid reservoir 340 with a grease gun head (e.g., the grease gun head 110).

Further, fluid reservoir main body 402 proximal end may include a lip 406a or 406b (or a lip 406). In particular, the fluid reservoir main body 402 proximal end may be shaped as the lip 406, which may seal the attachment 400 to the fluid reservoir main body 402 such that the attachment 400 may not slide out of the fluid reservoir main body 402. In addition, the lip 406 may be configured to engage with the grease gun socket 115 and seal the fluid reservoir 340 with the grease gun head 110/grease gun socket 115.

In some aspects, the lip 406 may extend outwards from the fluid reservoir main body 402. For example, the lip 406 may extend perpendicularly (at 90 degrees) from the fluid reservoir main body 402 and seal the attachment 400 on the fluid reservoir main body 402, as shown in FIG. 4A. Specifically, the lip 406a is shown to extend perpendicularly from the fluid reservoir main body 402. In other aspects, the lip 406 may extend at a slope angle different from 90 degrees, such as 45 degrees (or any other angle), as shown in FIG. 4B. Specifically, the lip 406b is shown to extend from the fluid reservoir main body 402 at a slant angle that is different from 90 degrees. Stated another way, the fluid reservoir main body 402 may have a perpendicular or a chamfer edge/lip.

FIGS. 5A-5D depict different embodiments of an end cap 500 in accordance with the present disclosure. The end cap 500 may be configured to cover the fluid reservoir 340. Specifically, the end cap 500 may be configured to seal a fluid reservoir top such that the fluid (e.g., grease) may be enclosed inside the fluid reservoir 340 and may prevent grease leakage from the fluid reservoir 340.

In some aspects, the end cap 500 may removably couple with the attachment 305. The end cap 500 may be pushed down or screwed over threaded attachment portion (e.g., the threads 404) to cover the fluid reservoir 340. In some aspects, the end cap 500 may be made of plastic, aluminum or any other similar material.

Figure 5A:
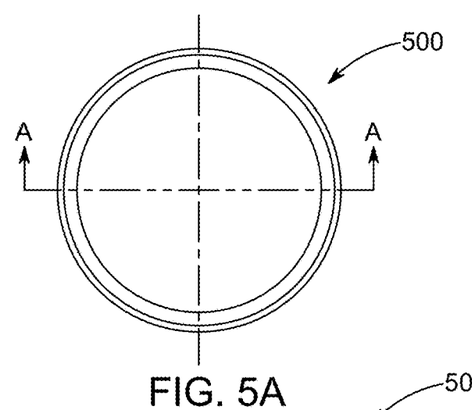
FIGS. 5A-5D depict different embodiments of an end cap in accordance with the present disclosure.

In particular, FIG. 5A depicts a top view of the end cap 500. The end cap 500 may be circular in shape to complement an attachment/fluid reservoir shape. In other aspects, the end cap 500 may be rectangular or of any other shape based on the attachment/fluid reservoir shape. For example, when the fluid reservoir 340 or the attachment 305 is cylindrical in shape, the end cap shape may be circular. In this case, the end cap 500 may have a diameter that may be equal or equivalent to a fluid reservoir 340 diameter or an attachment 305 diameter. Similarly, when the fluid reservoir 340 or the attachment 305 is cuboidal in shape, the end cap shape may be rectangular.

Figure 5B:
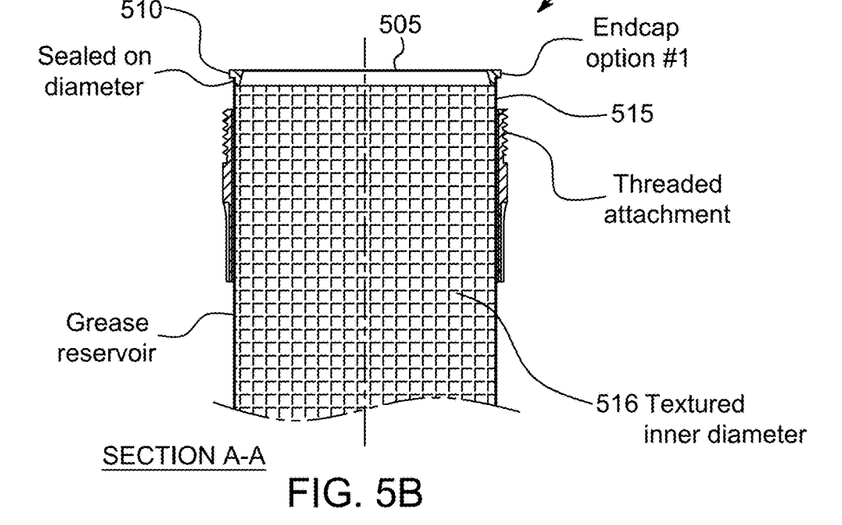
Figure 5C:
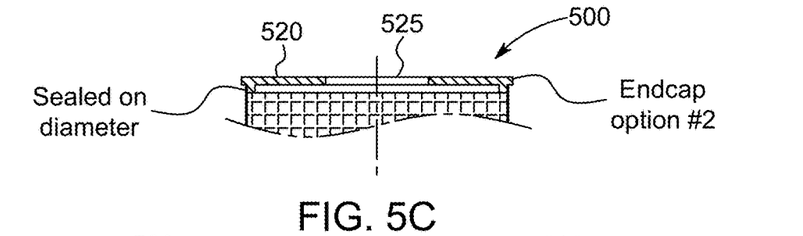
Figure 5D:
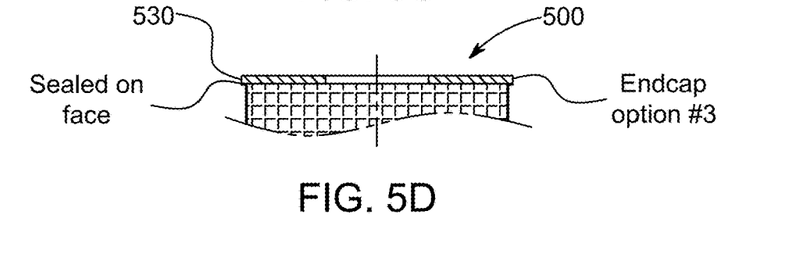

FIGS. 5B-5D depict different embodiments of end cap 500 sealing over the fluid reservoir 340. In particular, FIG. 5B illustrates the end cap 500 that may be sealed across the fluid reservoir 340 diameter (or the attachment 305 diameter) over the fluid reservoir 340 top portion. In some aspects, the end cap 500 may include a first portion 505 and a second portion 510. The first portion 505 may be a flat surface and have a first diameter. The flat surface may be circular, rectangular, hexagonal and the like, as described above. The second portion 510 may protrude from the first portion 505 and may be perpendicular to the first portion 505. The second portion 510 may have a second diameter. In some aspects, the second diameter may be less than the first diameter. In other aspects, the second diameter may be equal or greater than the first diameter.

In some aspects, the second portion 510 may be configured to fit inside a wall 515 of a fluid reservoir main body (e.g., the fluid reservoir main body 320), shown in FIG. 5B. In other words, a second portion 510 outer surface may contact a wall 515 inner surface. In some aspects, the second portion 510 may be circular, rectangular and the like. The second portion 510 shape may be based on the fluid reservoir main body 320 shape.

In accordance with the present disclosure, the user may remove the end cap 500 from the fluid reservoir 340 and attach the fluid reservoir 340 to the grease gun socket 115. As described above, the fluid reservoir 340 diameter may be same as the grease gun socket 115 diameter, which may be same as or equivalent to an end cap 500 diameter (e.g., a first portion 505 diameter).

In some aspects, the fluid reservoir 340 may include a textured inner surface/diameter 516. The textured inner surface/diameter 516 facilitates complete evacuation of grease from the fluid reservoir 340, and thus prevents grease wastage.

In another aspect, shown in FIG. 5C, the end cap 500 may have a ring-like structure and may include a fixed portion 520 and an openable portion 525. The fixed portion 520 may be an extension of the wall 515. The openable portion 525 may be removed and the fluid reservoir 340 may be connected to the grease gun socket 115 through the openable portion 525. An openable portion 525 diameter may be same as or equivalent to the grease gun socket 115 diameter. In some aspects, the end cap 500 may have different openable portion 525 diameters based on the grease gun socket 115 diameter. In further aspects, the end cap 500 may only have the openable portion 525 and no fixed portion 520, as shown in FIG. 5B.

In further aspects, the end cap 500 may be sealed on fluid reservoir 340 face (or attachment 305 face), as shown in FIG. 5D. In particular, the end cap 500 may be sealed on a lip 530 (same as the lip 406). As described above, the lip 530 may be configured to seal the attachment 305, such that the attachment 305 may not slide out of the wall 515 or the fluid reservoir 340. In this case, the end cap 500 may only have the first portion 505 (and no second portion 510) which may be sealed with the lip 530 and/or with a wall 515 top edge. Stated another way, the end cap 500 may be a circular or a rectangular plate, which may engage directly with the lip 530 and/or the wall 515 top edge, and seal the fluid reservoir 340.

Figure 6:
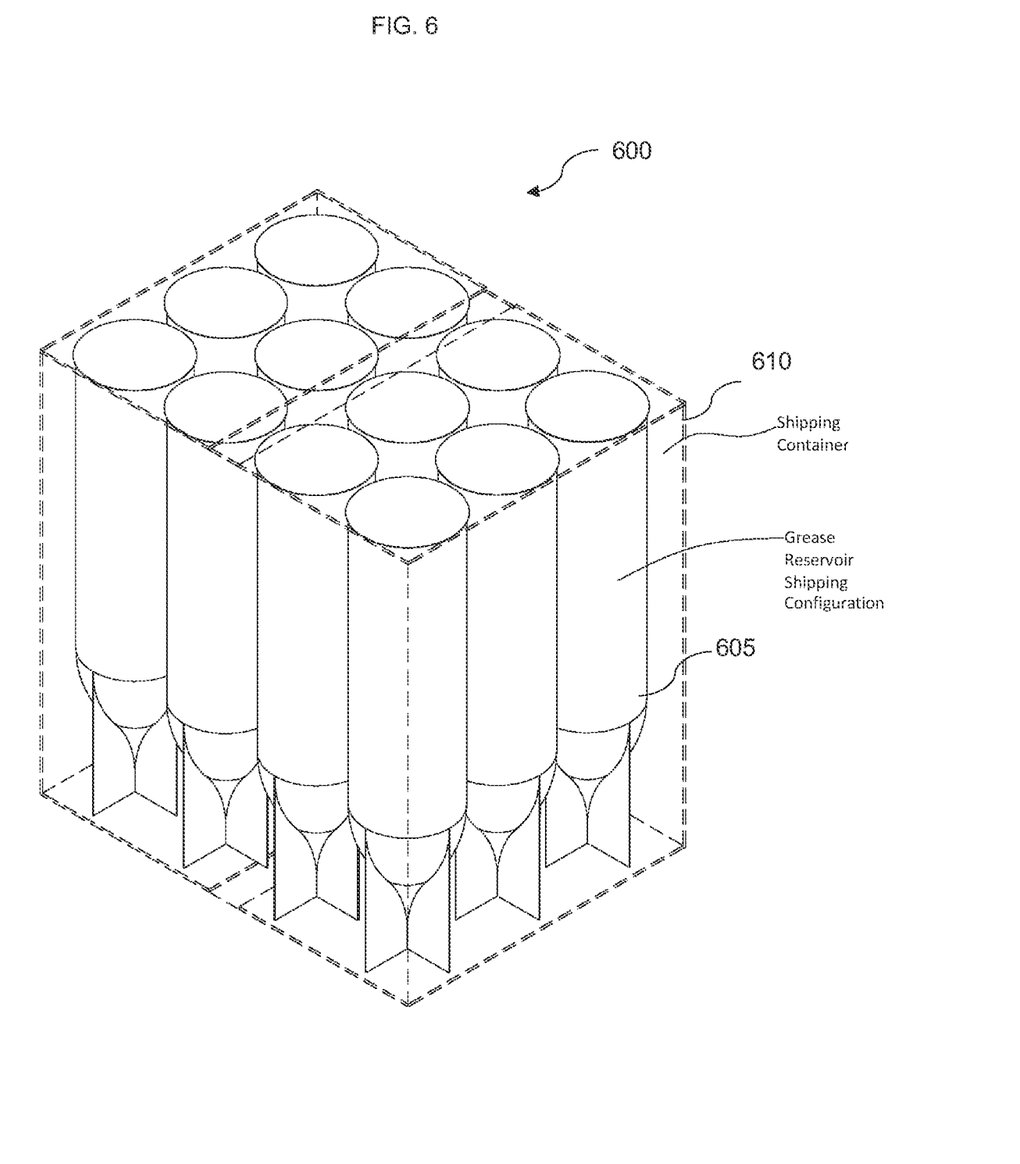
FIG. 6 depicts a packaging of a plurality of fluid reservoirs in accordance with the present disclosure.

FIG. 6 depicts a packaging 600 of a plurality of fluid reservoirs 605 (same as the fluid reservoir 340) in accordance with the present disclosure. In particular, FIG. 6 depicts a container 610 in which the plurality the fluid reservoirs 605 may be placed. The user may use the container 610 for storing and shipping the fluid reservoirs 605. The container 610 may be made of any material including, but not limited to, cardboard, wood, plastic and/or the like. The container 610 may be of any shape and size, which may be based on a number of fluid reservoirs 605 to be stored in the container 610. For example, the container 610 may contain 12 fluid reservoirs 605, as shown in FIG. 6.

As shown in FIG. 6, the user may place the plurality of fluid reservoirs 605 in the container 610 in a vertical position. The plurality of fluid reservoirs 605 may include double-sealed seam at fluid reservoirs bottom ends. As described above in conjunction with FIG. 3B, the double-sealed seam may include two seams disposed at a predefined angle from each other. In some aspects, the two seams may be disposed at an angle of 90 degrees from each other. The double-sealed seam may enable the user to place the fluid reservoirs 605 in a vertical position. Stated another way, the double-sealed seam may provide a stable base to the fluid reservoirs 605.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fluid reservoir configured to attach to a pump head, the fluid reservoir comprising:
   an attachment configured to engage with a pump head socket, where the attachment comprises threads at an attachment outer surface portion; and
   a fluid reservoir main body comprising a proximal portion and a distal portion, wherein:
      the proximal portion is connected to the attachment, and
      the distal portion comprises a first sealed seam,
   wherein the fluid reservoir main body is flexible and configured to dispense a fluid from the fluid reservoir when a negative pressure is applied to a fluid reservoir interior side, and
   wherein the attachment has a diameter that is equal to a diameter of the proximal portion.

2. The fluid reservoir of claim 1, wherein the proximal portion is cylindrical.

3. The fluid reservoir of claim 1, wherein a proximal portion length is greater than a distal portion length.

4. The fluid reservoir of claim 1, wherein the distal portion further comprises a second sealed seam.

5. The fluid reservoir of claim 4, wherein a first sealed seam plane is perpendicular to a second sealed seam plane.

6. The fluid reservoir of claim 1, wherein the attachment and the fluid reservoir main body form a single piece tube.

7. The fluid reservoir of claim 1, wherein the fluid reservoir main body is made of plastic or rubber.

8. The fluid reservoir of claim 1, wherein the fluid reservoir further comprises an end cap removably coupled to the attachment.

9. The fluid reservoir of claim 8, wherein the end cap has a diameter that is equal to the diameter of the attachment.

10. The fluid reservoir of claim 8, wherein the end cap is sealed on an attachment face.

11. The fluid reservoir of claim 8, wherein the end cap is sealed on the diameter of the attachment.

12. The fluid reservoir of claim 8, wherein the end cap is circular in shape.

13. The fluid reservoir of claim 1, wherein the fluid reservoir is a grease tube.

14. The fluid reservoir of claim 1 further comprising a removable closure on the attachment.

15. The fluid reservoir of claim 14, wherein the removable closure is made of aluminum.

16. The fluid reservoir of claim 1, wherein the attachment is located at a fluid reservoir proximal end and the fluid reservoir main body is located at a fluid reservoir distal end.

17. A fluid reservoir configured to attach to a pump head, the fluid reservoir comprising:
   an attachment configured to engage with a pump head socket, where the attachment comprises threads at an attachment surface portion; and
   a fluid reservoir main body comprising a proximal portion and a distal portion, wherein:
      the proximal portion is connected to the attachment, and
      the distal portion comprises a first sealed seam and a second sealed seam, wherein
      a first sealed seam plane is perpendicular to a second sealed seam plane, and
   wherein the fluid reservoir main body is flexible and configured to dispense a fluid from the fluid reservoir when a negative pressure is applied to a fluid reservoir interior side.

18. The fluid reservoir of claim 17, wherein the attachment and the fluid reservoir main body form a single piece tube.

19. The fluid reservoir of claim 17, wherein the attachment has a diameter that is equal to a diameter of the proximal portion.

20. A fluid reservoir configured to attach to a pump head, the fluid reservoir comprising:
   an attachment configured to engage with a pump head socket, where the attachment comprises threads at an attachment outer surface portion;
   an end cap removably coupled to the attachment, wherein the end cap has a diameter that is equal to a diameter of the attachment; and
   a fluid reservoir main body comprising a proximal portion and a distal portion, wherein:
      the proximal portion is connected to the attachment, and
      the distal portion comprises a first sealed seam,
   wherein the fluid reservoir main body is flexible and configured to dispense a fluid from the fluid reservoir when a negative pressure is applied to a fluid reservoir interior side, and
   wherein the diameter of the attachment is equal to a diameter of the proximal portion.

\* \* \* \* \*